United States Patent [19]

Föttinger et al.

[11] Patent Number: 4,886,527

[45] Date of Patent: Dec. 12, 1989

[54] MULTILAYER ELECTRET FILTER AND PROCESS OF USING SAME

[75] Inventors: Walter Föttinger; Michael Hauber; Arnold Weghmann, all of Weinheim, Fed. Rep. of Germany

[73] Assignee: Firma Carl Freudenberg, Weinheim/Bergstr., Fed. Rep. of Germany

[21] Appl. No.: 242,718

[22] Filed: Sep. 9, 1988

[30] Foreign Application Priority Data

Sep. 19, 1987 [DE] Fed. Rep. of Germany ....... 3731575

[51] Int. Cl.$^4$ ............................ B03C 9/02; G11C 13/02
[52] U.S. Cl. .......................................... 55/156; 55/482; 55/487; 55/DIG. 39; 55/307; 55/400
[58] Field of Search ............... 55/103, 155, 156, 482, 55/487, DIG. 39; 307/400

[56] References Cited

U.S. PATENT DOCUMENTS

| | | | |
|---|---|---|---|
| 2,612,966 | 10/1952 | Nicol | 55/103 |
| 3,449,094 | 6/1969 | Baxt et al. | 307/400 |
| 4,093,437 | 6/1978 | Ichihara et al. | 55/487 |
| 4,133,653 | 1/1979 | Soltis | 55/155 |
| 4,215,682 | 8/1980 | Kubik et al. | 55/103 |
| 4,323,374 | 4/1982 | Shinagawa et al. | 55/DIG. 39 |
| 4,513,049 | 4/1985 | Yamasaki et al. | 307/400 |
| 4,650,506 | 3/1987 | Barris et al. | 55/487 |
| 4,661,255 | 4/1987 | Aumann et al. | 210/491 |
| 4,759,782 | 7/1988 | Miller et al. | 55/487 |

FOREIGN PATENT DOCUMENTS

| | | | |
|---|---|---|---|
| 2503615 | 7/1975 | Fed. Rep. of Germany | 55/487 |
| 2706017 | 8/1978 | Fed. Rep. of Germany | 55/487 |
| 2126497 | 3/1984 | United Kingdom . | |

OTHER PUBLICATIONS

"Particle Collection in Electret Fiber Filters-A Basic Theoretical and Expertmental Study" pp 346-351 from Sep./Oct. 1987 Issue of Filtration & Separation by H. Baumgartner et al.

*Primary Examiner*—Jay H. Woo
*Assistant Examiner*—C. Scott Bushey
*Attorney, Agent, or Firm*—Kenyon & Kenyon

[57] ABSTRACT

A multilayer filter pack includes at least three adjacent layers of fibrous material, each of which is permanently electrically charged and not more than 10 mm thick. The upstream and middle layers are formed from fibers having a fiber diameter that decreases from layer to layer in the direction of flow and are arranged at a packing density that increases from layer to layer in the direction of flow. The third layer has a fiber diameter and packing density that is approximately equal to the fiber diameter and packing density of the first layer. The multilayer filter pack is particularly well suited for use in air-purifying systems and breath protection filters.

10 Claims, 1 Drawing Sheet

MULTILAYER ELECTRET FILTER AND PROCESS OF USING SAME

BACKGROUND OF THE INVENTION

The present invention relates generally to a multilayer air filter pack and more particularly to a multilayer air filter pack comprising at least three adjacent layers of fibrous material with each layer having a permanent electric charge.

The term "fibrous electret" is used hereinafter to describe a fibrous web of material which carries a permanent charge. Such a material is known and when stored under typical conditions can retain a useful charge for many years. Under accelerated testing, such as storage in a room-temperature 100-percent relative humidity environment, the charge on this type of fibrous material may have a half-life ranging from one week to six months or a year. With such a persistence of charge, fibers and fibrous webs of material of this type can be properly termed electrets. U.S. Pat. No. 4,215,682 discloses an example of one such fibrous electret material that may be employed in the layers of the filter pack disclosed herein.

In German Patent 29 41 094, a filter element is disclosed that comprises the combination of an uncharged filter material acting as a prefilter and a fibrous electret filter material acting as a postfilter. According to Example 3 of this patent, the filter pack can be constructed with multiple layers and with fiber layers of the same design, but in order to keep coarser particles away from the fibrous electret filter material, the filter pack is always used in combination with an uncharged prefilter. Such a filter element does not meet the frequently occurring requirement of reliably filtering small to very small particles (i.e., from 10 to 0.05 um) and bacteria, when the filter element is loaded by a considerable quantity of particles, a majority of which, or all of which, are in this size range.

In the German Patent discussed above a medium-coarse uncharged prefilter allows small particles to pass therethrough unimpeded. These particles immediately load the adjoining fibrous electret filters to their full extend at the outset of the filtering process. If these fibrous electret filters have, as is disclosed in the German patent as being preferred, a low air resistance, they act almost exclusively as an electrostatic filter and become rapidly ineffective as very-fine filters due to neutralization of their charge. This allows a very large number of impinging small particles to pass through the filters, which now effectively act solely as pure coarse filters. The degree of filtration of the small particles rapidly drops by up to a factor of 10 of the initial value.

In order to avoid this detrimental effect, the fibrous electret layers in filter elements constructed according to the German patent could be made so dense that the electrostatic effect cooperates with the mechanical separation effect. However, this would lead to an intolerably high pressure drop and such a filter element would be rapidly clogged-up with particles if the filter elements were subjected to a large quantity of particles. If the uncharged prefilter were made denser, the air resistance of the entire air filter element likewise would be increased in an unfavorable manner.

The present invention is directed to the problem of providing a fibrous electret filter pack that can withstand loading with particles, a majority of which, or all of which, are in the size range of 10 to 0.05 um in diameter and still obtain long service life, the best possible filter performance and low air resistance, without exhibiting the above-mentioned disadvantages. In order to achieve this, it is important that as many of the small particles as possible are intercepted on the upstream or input side of the filter pack.

SUMMARY OF THE INVENTION

The present invention solves this problem by providing a multilayer filter pack comprising at least first, second and third adjacent layers of fibrous electret material formed from fibers having a predetermined fiber diameter arranged in each layer at a predetermined packing density with each layer having a permanent electric charge and a thickness not greater than 10 mm. The first layer is disposed upstream of the second layer. The fiber diameter of the first and second layers decreases from the first layer to the second layer in the direction of flow and the packing density of the first and second layers increases from the first layer to the second layer in the direction of flow. Particularly advantageous results can be obtained when the fiber diameter of the first layer lies in the range of 10 to 30 um and the fibers are arranged at a packing density in the range of 0.01 to 0.07 while the fiber diameter of the second downstream layer lies in the range of 0.5 to 10 um and the fibers are arranged to a packing density of 0.03 to 0.1. The third layer of fibrous electret material is disposed in a position downstream of the second layer and is formed from fibers having a fiber diameter approximately equal to the fiber diameter of the first layer arranged at a packing density approximately equal to the packing density of the first layer. For certain applications, each of the adjacent layers of fibrous electret material may carry mutually opposite charges. An advantageous method of filtering particles also is disclosed herein.

The progressive fiber diameter and packing density construction of the multilayer filter pack of the invention, in which all of the layers are formed from fibrous electret material, advantageously filters more than 50% of the particles having a grain size of 10 to about 0.5 um on the upstream or input side of the filter pack without the need to make allowances for air resistance. In this manner, the particularly fine fibers of the downstream layers are not loaded by the coarser particles and are free to act as "policing fibers" for filtering the finest particles, i.e., those having a size of about 0.05 um. This enables the multilayer filter pack of the invention to reliably filter bacteria, which are typically of a size of about 0.05 um.

With the present invention, the degree of filtration provided by the first upstream filter layer alone, when loaded with filter particles having a grain size of 10 to 0.05 um, is increased over known filters from 10 to about 75%. This increase leads to an overall improvement in the degree or efficiency of filtration of the filter pack. However, if the increase in filter performance is not absolutely required, the total resistance of the filter pack may be advantageously reduced while maintaining filtration performance comparable to known filters. This is accomplished by reducing the degree of filtration of the downstream or output layer by decreasing its weight per unit area.

When filtering dust concentrations equal to or greater than 1 mg/m$^3$, the overall filtration efficiency of the multilayer filter pack of the invention is nearly constant over a given loading time until twice the initial pressure difference is reached. The electret filter action from the fibrous electret material decreases after twice the initial pressure is reached, but is more than compensated by the increasing mechanical filter action due to the accumulation of dust cake.

The dust storage capacity of the multilayer filter pack of the invention may be tripled due the electret filter action of the upstream filter, depending on the type of dust and the size of the dust particles.

Due to its high filtration performance with respect to small to very small particles (i.e., 10 to 0.05 um) and the particularly low air resistance achievable when only filtration performance comparable to uncharged filter packs is desired, the multilayer filter pack of the invention is particularly well suited for use in air-purifying systems and breath protection filters. It also may be used as a postfilter for coarse filter systems, such as vacuum cleaner bag filters.

DETAILED DESCRIPTION

A multilayer filter pack constructed according to the principles of the invention is described herein. A three layer filter pack 10 is schematically shown in cross section in FIG. 1. The arrow indicates the direction of flow. Filter pack 10 is highly economical and preferred for filtration of a wide range of dust particles having grain size diameters ranging from 10 to 0.05 um. Especially good filtration is achieved if the layer 11 on the upstream or input side of the filter is formed from fibrous electret material having a fiber diameter in the range of 10 to 30 um with fibers arranged at a packing density in the range of 0.01 to 0.07 and the middle layer 12 is formed from fibrous electret material having a fiber diameter in the range of 0.5 to 10 um with fibers arranged at a packing density in the range of 0.03 to 0.1.

The packing density ($\alpha$) is understood here and in the following to be the difference between 1 (representative of no porosity) and the porosity $\epsilon$ i.e., $\alpha = 1 - \epsilon$. The porosity is obtained in accordance with DIN 53 855 from the quotient $$\epsilon = \frac{\rho_n - \rho_{rx}}{\rho_n}$$

where
$\epsilon$ = porosity
$\rho_n$ = normal density
$\rho_{rx}$ = gross density The foregoing ranges given for fiber diameter and packing density of the first two layers represent the values required to achieve a high degree of filtration, a large dust storage capacity, as well as a low air resistance, regardless of the presence of further filter layers.

Figure 1:
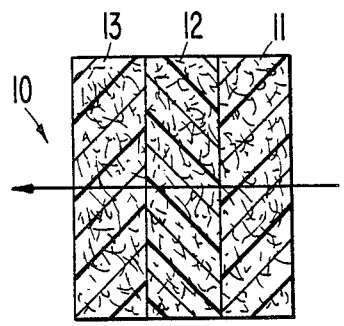
FIG. 1 is a schematic cross sectional view illustrating a multilayer filter pack constructed according to the principles of the invention.

Filter pack 10 comprises a third layer 13 added to layers 11 and 12 of filter pack 10 shown in FIG. 1. The third layer 13 is provided on the output or downstream side of the filter pack adjacent to the second middle layer 12. Layer 13 is formed from fibrous electret material having a fiber diameter in the range of 10 to 30 um with fibers arranged at a packing density in the range of 0.01 to 0.07. According to known filter theory, addition of this third layer 13 should not have produced a noticeable filtration effect. Surprisingly however, a distinct increase in the overall filtration efficiency of the filter pack was achieved without the need to tolerate or compensate for a significant increase in the overall flow resistance of the filter pack. Reference is made to the following Example 2 for details of some of the results obtained by addition of the third layer.

The fibrous electret material defining layer 11 on the upstream or input side of filter pack 10 and layer 13 on the downstream or output side may be formed from polypropylene and/or polyethylene. The fibrous electret material defining the middle layer 12 may be formed from polypropylene, polyethylene, polycarbonate or polysulfone. All of the layers of the multilayer filter pack of the invention are formed from fibrous electret material, as previously discussed, and may be provided with a high electric insulation resistance.

For special applications, in which highly charged dust particles in the size range of 10 to 0.05 um are present, the individual layers of fibrous electret material are alternatively provided with a positive or negative charge. Charging the layers in this alternating manner ensures that positively, as well as negatively, charged dust particles are effectively filtered.

The specific design, filtration properties and advantages of multilayer filter packs constructed according to the principles of the invention is explained in greater detail below with reference to the following examples:

EXAMPLE 1

| | Example 1 | |
|---|---|---|
| (a) | Fiber layer on the input filter side: | |
| | 100% polypropylene, 1.7 dtex mean fiber diameter | 22 um |
| | weight per unit area (DIN 53 854): | 80 g/m$^2$ |
| | thickness (DIN 53 855): | 2.8 mm |
| | porosity: | 0.969 |
| | packing density: | 0.031 |
| (b) | Middle fiber layer: | |
| | 100% Polycarbonate, mean fiber diameter | 8 um |
| | weight per unit area (DIN 53 854): (ba) | 16 g/m$^2$ |
| | weight per unit area (DIN 53 854): (bb) | 8 g/m$^2$ |
| | thickness (DIN 53 855): (ba) | 0.3 mm |
| | thickness (DIN 53 855): (bb) | 0.15 mm |
| | porosity: | 0.956 |
| | packing density: | 0.044 |
| (c) | Fiber layer on the outside filter side: (same characteristics as layer (2a) on input side) | |

The various filter layers were arranged according to FIG. 1, built into a large area mounting and were tested for filter performance. Two middle layers having different thicknesses and weights per unit area were prepared and separately tested as represented by ba) and bb) given above. In the testing process the total degree of filtration A was determined relative to a carbon black aerosol ($x_{50}$ = 0.02 um) and the dust storage capacity (SSV) of the filter pack was determined gravimetrically. The filter data was determined at a flow velocity of 25 cm/s, a final differential pressure $\Delta P_E$ of 600 Pa and a carbon black concentration of 67 mg/m$^3$ with a dust loading of about 1 g/m$^2$/min. The test results are listed in the following table:

| Layers | Area weight layer (b) (g/m²) | ΔP_A (Pa) | ΔP_E (Pa) | A (%) | SSV (g/m²) |
|---|---|---|---|---|---|
| (a) + (c) — uncharged + (ba) - fibrous electret | 16 | 50 | 600 | 96.4 | 34.3 |
| (a) + (ba) + (c) — fibrous electret | 16 | 50 | 600 | 98 | 70.6 |
| (a) + (bb) + (c) — fibrous electret | 8 | 35 | 600 | 96.1 | 81.1 |

Use of fibrous electret instead of uncharged fibrous material for the two outer layers improved the degree of filtration of the filter pack against carbon black from 96.4% to 98%. At the same time, the dust storage capacity (SSV) at the final differential pressure $\Delta P_E = 600$ Pa was increased by the factor of $70.6/34.3 = 2.06$. The third entry on the above chart shows that decreasing the weight per unit area of the middle filter layer from 16 g/m² to 8 g/m² decreased the initial differential pressure $\Delta P_A$ of the filter pack from 50 to 35 Pa and increased the dust storage capacity from 70.6 to 81.1 g/m² without adversely affecting the overall filtration efficiency (96.4 to 96.1%).

EXAMPLE 2

(a) Fiber layer on the input filter side:
   (same characteristics as layer (a) in Example 1)
(b) Middle fiber layer:
   100% Polycarbonate, mean fiber diameter   5 um
   weight per unit area (DIN 53 854):   11 g/m²
   thickness (DIN 53 855):   0.2 mm
   porosity:   0.954
   packing density:   0.046
(c) Fiber layer on the output filter side:
   (same characteristics as layer a) above on the input filter side)

The various filter layers were built into a large area mounting and tested for filter performance in accordance with DIN 3181/T2. The degree of passage through the filter was determined as compared with NaCl ($D_{NaCl}$) at a flow velocity of 8 cm/s and yielded the following results:

| Layers | Δp (Pa) at 8 cm/s | $D_{NaCl}$ (%) at 8 cm/s |
|---|---|---|
| (a) + (b) — fibrous electret | 17 | 5.4 |
| (a) + (b) + (c) — fibrous electret | 19 | 4.4 |

The addition of a third layer arranged on the downstream or output filter side, having identical characteristics with the layer on the upstream or input filter side, surprisingly increased the overall filter performance of the filter pack from a 5.4% degree of passage to 4.4% or by more than 18% (5.4–4.4/5.4).

Figure 2:
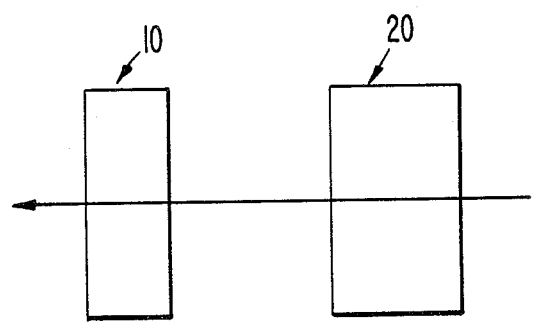
FIG. 2 is a schematic drawing showing the multilayer filter pack in combination with a coarse filter system.

FIG. 2 is a schematic drawing showing the multilayer filter pack 10 disposed downstream of a coarse filter system 20 which may be, for example, a vacuum cleaner bag filter.

What is claimed is:

1. A multilayer filter pack comprising at least first, second and third adjacent layers of fibrous electret material formed from fibers having a predetermined fiber diameter arranged in each layer at a predetermined packing density with each layer having a permanent electric charge and a thickness greater than twice the predetermined fiber diameter of its respective layer and less than 10 mm wherein said first layer is disposed in a position upstream of the second layer and is formed from fibers having a fiber diameter in the range of 10 to 30 um arranged at a packing density in the range of 0.01 to 0.07, said second layer is formed from fibers having a fiber diameter in the range of 0.5 to 10 um arranged at a packing density in the range of 0.03 to 0.1., said third layer is disposed in a position downstream of said second layer and is formed from fibers having a fiber diameter approximately equal to the fiber diameter of the first layer arranged at a packing density approximately equal to the packing density of the first layer and the fiber diameter of said first and second layers decreases from the first layer to the second layer in the direction of flow and the packing density of said first and second layers increases from the first layer to the second layer in the direction of the flow wherein more than 50% of particles of a medium to be filtered having a grain size in the range of 10 to about 0.5 um are filtered by the first layer.

2. A multilayer filter pack according to claim 1 wherein each layer of fibrous electret material carries a single charge that is mutually opposite from the charge of its adjacent layer.

3. A multilayer filter pack according to claim 1 in combination with a filter system disposed upstream of said multilayer filter pack, said filter system allows particles to pass therethrough that are larger in size than the particles allowed to pass through said multilayer filter pack.

4. A multilayer filter pack according to claim 2 in combination with a filter system disposed upstream of said multilayer filter pack, said filter system allows particles to pass therethrough that are larger in size than the particles allowed to pass through said multilayer filter pack.

5. A multilayer filter pack according to claim 1 wherein the thickness of the first layer is approximately equal to the thickness of the third layer.

6. A method of filtering particles from a medium comprising the steps of:
   (a) passing a medium to be filtered through a first layer of fibrous electret material having a first fiber diameter in the range of 10 to 30 um, a first packing density in the range of 0.01 to 0.07 and a thickness greater than twice the first fiber diameter and less than 10 mm;
   (b) subsequently passing said medium through a second layer of fibrous electret material adjacent to said first layer, said second layer having a thickness not greater than 10 mm and a second packing density in the range of 0.03 to 0.1; and
   (c) subsequently passing said medium to be filtered through a third layer of fibrous electret material adjacent to said second layer, said third layer having a thickness not greater than 10 mm, a third fiber diameter approximately equal to the first fiber diameter and a third packing density approximately equal to the first packing density wherein more than 50% of the particles of the medium having a grain size in the range of 10 to about 0.5 um are filtered by the first layer.

7. The method of claim 6 wherein each of said first, second and third layers of fibrous electret material carry a single charge that is mutually opposite from the charge of its adjacent layer.

8. The method of claim 6 wherein prior to passing the medium through said first layer the medium is passed through a filter system that allows particles to pass therethrough that are larger in size than the particles allowed to pass through said first, second and third layers.

9. The method of claim 7 wherein prior to passing the medium through said first layer the medium is passed through a filter system that allows particles to pass therethrough that are larger in size than the particles allowed to pass through said first, second and third layers.

10. The method of claim 6 wherein the thickness of the first layer is approximately equal to the thickness of the third layer.

* * * * *